May 14, 1963
H. E. SPRAGUE ET AL
3,089,425
MAGNETIC PUMP
Filed Jan. 30, 1961
2 Sheets-Sheet 1
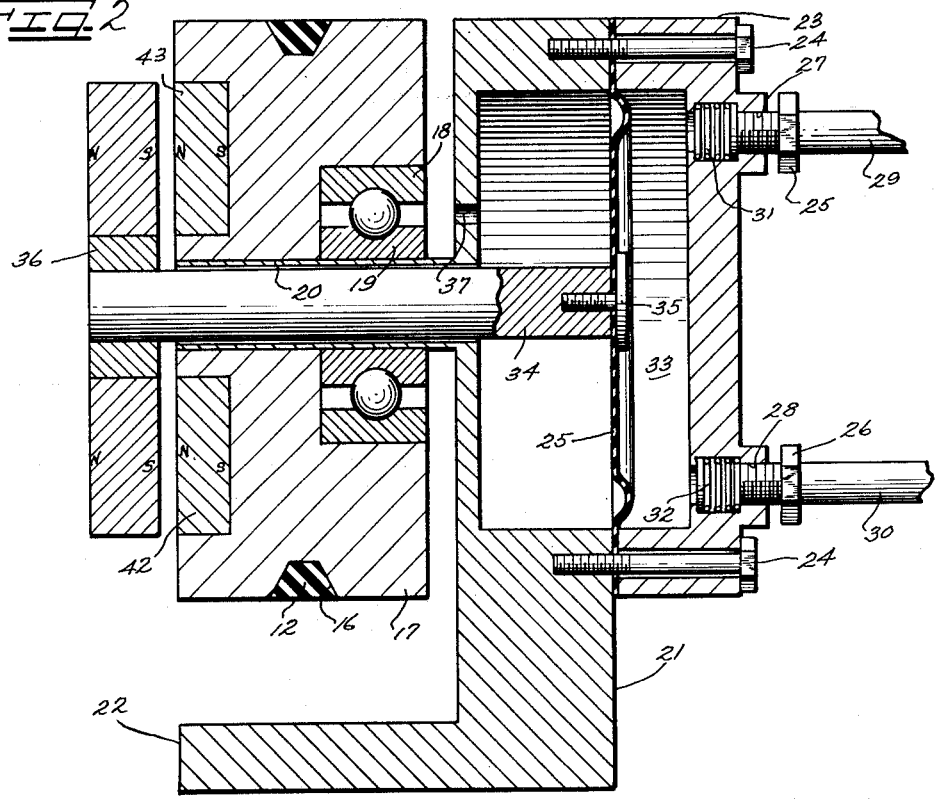
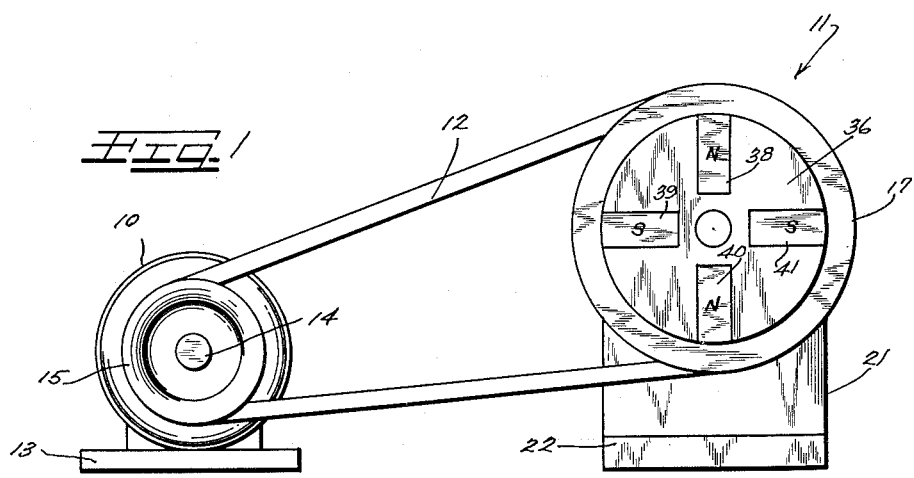
INVENTORS
HAROLD E. SPRAGUE
MERLE E. OLSON
BY
ATTORNEYS

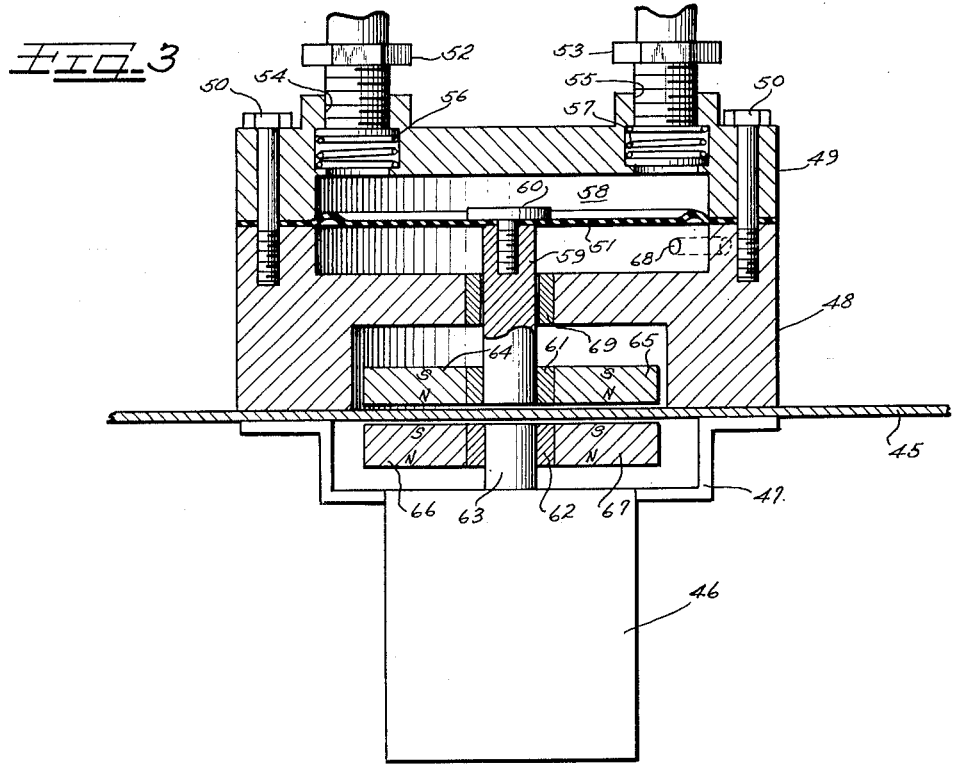
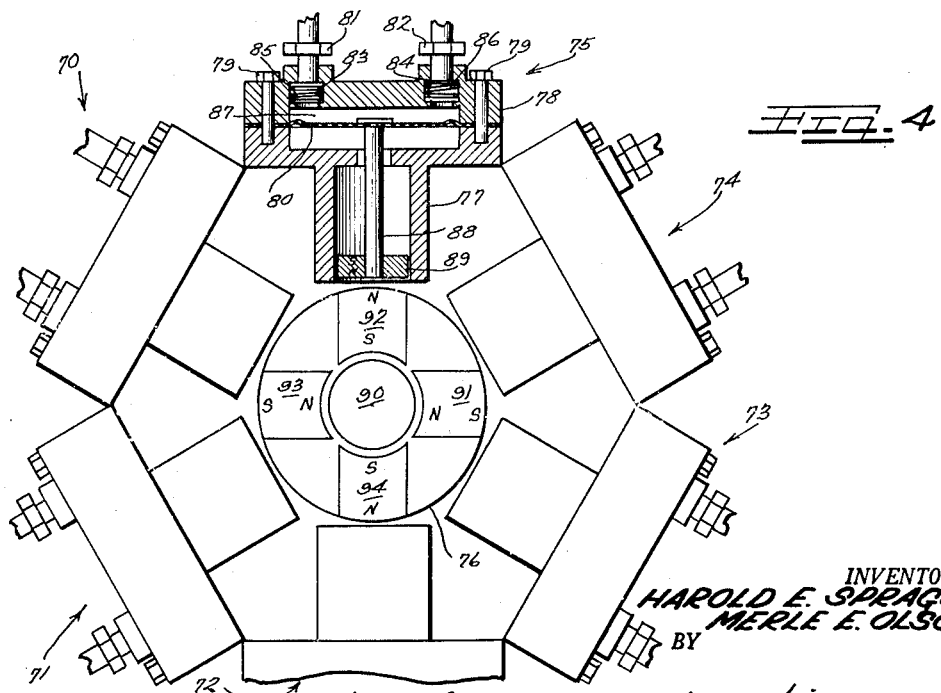

United States Patent Office 3,089,425
Patented May 14, 1963

3,089,425
MAGNETIC PUMP
Harold E. Sprague, Chagrin Falls, and Merle E. Olson, Chesterland, Ohio, assignors to Thompson Ramo Wooldridge Inc., Cleveland, Ohio, a corporation of Ohio
Filed Jan. 30, 1961, Ser. No. 85,555
2 Claims. (Cl. 103—152)

This invention relates to motion convertors and, more particularly, to a magnetic apparatus for converting rotary motion into linear reciprocating motion.

Conventional mechanisms for producing reciprocating motion are usually mechanical. Ordinarily they require a reciprocating mechanical member such as a crank and connecting rod, an eccentric, a piston, etc., which are expensive since they require that additional parts be made and fitted to the reciprocating member. In addition, all of these mechanical mechanisms must give a positive displacement. In other words the length of the stroke of these members cannot be readily changed, which in some cases is a distinct handicap. For example, a crank driven pump will produce air or liquid in quantities that are proportional to the speed of the pump, and the only way these quantities can be varied is to provide a relief valve.

Accordingly, it is an object of this invention to provide a magnetic rotary motion to reciprocating linear motion convertor which obviates these difficulties. A convertor constructed in accordance with this invention does not require expensive mechanical fittings and has a self regulating feature due to the fact that no greater force can be applied by the reciprocating member than the magnetic strength of the device will afford.

It is another object of this invention to provide such a convertor that drives a pump which has a flexible diaphragm fastened to the reciprocating member.

It is another object of this invention to provide such a convertor which is adapted to drive a fluid pump through an intervening wall.

It is still another object of this invention to provide such a convertor which is adapted to drive a plurality of fluid pumps simultaneously.

These and other objects of the invention are attained by providing an apparatus that includes two sets of magnets, the first set being part of a member that is mounted for reciprocating motion and the other set being part of a member that is mounted for rotary motion. The two members are mounted adjacent each other and the magnets alternately present north and south magnetic poles. The reciprocating motion is obtained from the attraction and repulsion created by alternately bringing like and unlike poles together as the rotatably mounted member is driven relative to the member that is mounted for reciprocation motion.

Other objects and features and advantages of the present invention will be apparent from the following detailed description taken in conjunction with the accompanying figures of the drawings, in which:

FIGURE 1 is an illustration of an apparatus for converting rotary motion to reciprocating motion wherein the convertor is connected to drive a fluid pump in accordance with one embodiment of the invention;

FIGURE 2 is a sectional view of the apparatus illustrated in FIGURE 1;

FIGURE 3 is a sectional view of a convertor that is adapted to drive a fluid pump through an intervening wall; and FIGURE 4 is an illustration of an apparatus wherein a plurality of fluid pumps are driven by a single rotary member.

As shown on the drawings:

Rotary motion to reciprocating motion convertors constructed in accordance with the invention can be applied to numerous devices such as vibrating screwdrivers, light riveting hammers, feed mechanisms for movie projectors, health vibrators, ultrasonic vibrators, pumps, shavers and clippers, etc. Therefore, it should be understood that although the following description applies to convertors connected to drive fluid pumps, their application is not so limited.

With reference to the embodiment of the invention illustrated in FIGURES 1 and 2, a rotary electric motor 10 is connected to drive a fluid pumping mechanism 11 by a belt 12. The motor 10 has its base 13 mounted on a suitable stable platform and its rotor shaft 14 connected to a sheave 15. The belt 12 is disposed in the sheave 15 and a groove 16, FIGURE 2, formed in a rotatable member 17 of the pumping mechanism 11.

With reference to FIGURE 2, the rotatable member 17 is mounted on the outer ring 18 of a radial ball bearing that has its inner ring 19 fixed to a hollow shaft 20. This shaft 20 forms part of a lower housing 21 whose lower portion 22 forms a mounting bracket for the fluid pumping mechanism.

An upper housing 23 is fastened to the lower housing 21 by a plurality of bolts 24 which are inserted through holes formed in the upper housing 23 and threaded into the lower housing 21. A flexible diaphragm has its periphery disposed between the upper and lower housings and is held in place by tightening the bolts 24 down. Two fluid couplings 25 and 26 are threaded into two openings 27 and 28, respectively, formed in the upper housing 23 and are additionally attached to two fluid conduits 29 and 30. Two check valves 31 and 32 are fixed in the two openings 27 and 28, respectively, the check valve 31 permitting flow from the conduit 29 into the pump chamber 33 and the check valve 32 permitting flow from the chamber 33 into the conduit 30.

The flexible diaphragm 25 is fastened at approximately its center point to a connecting stem 34 by a bolt 35 that has an enlarged head. The stem 34 is fastened at its opposite end to a reciprocating member 36. It is apparent that if the reciprocating member 36 and the connecting stem 34 are caused to reciprocate or vibrate along the axis of the stem 34, the flexible diaphragm 25 will cause fluid to be drawn from the conduit 29 into the pump chamber 33 when it is moved toward the left and will cause fluid to flow from the chamber 33 into the conduit 30 when the diaphragm is forced toward the right. A vent 37 is formed in the lower housing 21 behind the diaphragm 25 to permit airflow into and out of the chamber behind the diaphragm as it vibrates.

Reciprocating motion is imparted to the connecting stem 34 and the reciprocating member 36 by a plurality of magnets fixed to both the rotatable member 17 and the reciprocating member 36. Four magnets 38–41, FIGURE 1, are fixed to the reciprocating member 36 and four similar magnets are fixed to the rotatable member 17, only two of these magnets 42 and 43 being illustrated in the sectional view of FIGURE 2. The faces of the eight magnets are polarized and they are mounted in these two members in such a manner that north and south poles are alternately presented as illustrated in FIGURE 1. Therefore, when the rotatable member 17 is caused by the motor 10 to rotate the connecting stem 34 vibrates or reciprocates along its axis due to the alternate repulsion and attraction exerted by alternately bringing like and unlike poles of the eight magnets together. This reciprocating motion is transmitted to the diaphragm 25 which causes the pumping action.

The embodiment of the invention illustrated in FIGURE 3 is designed to transmit reciprocated motion through an intervening nonmagnetic wall 45. A motor 46 and a frame 47 are fastened to one side of the wall 45, and the lower housing 48 of the pumping mechanism is fastened to the opposite side of this wall. The upper housing 49 is again fastened to the lower housing 48 by a plurality of bolts 50 and a flexible diaphragm 51 is disposed in the chamber between them. Two fluid couplings 52 and 53 are threaded into two openings 54 and 55, respectively, and two check valves 56 and 57 are fixed in the two openings. The check valve 56 is designed to permit fluid flow from the coupling 52 into the pump chamber 58 and the check valve 57 is designed to permit flow from the chamber 58 to the coupling 53.

A connecting stem 59 is fastened to the diaphragm 51 at its center section by a screw 60 and it is fastened at its opposite end to a reciprocating member 61.

On the side of the wall 45 opposite the reciprocating member 61 is disposed a rotatable member 62 that is fixed to the shaft 63 of the motor 46. An equal number of magnets are again fixed to the reciprocating member 61 and the rotatable member 62, two magnets 64 and 65 being shown attached to the reciprocating member 61 and two magnets 66 and 67 being shown attached to the rotatable member 62. These magnets have their faces polarized and are fixed to these members in such a manner that they alternately present north and south poles. Therefore, when the rotatable member 62 is driven by the motor 46 the member 61 is alternately attracted to the member 62 when opposite poles are adjacent each other and is repulsed when like poles are adjacent each other.

The flexible diaphragm 51 is driven in a vibratory motion and causes fluid to enter the chamber 58 from the conduit 52 and be discharged into the conduit 53. Once again, a vent 68 connects the exterior of the lower housing 48 to the chamber behind the diaphragm 51 so that air can enter and leave this chamber as the diaphragm 51 vibrates.

A bearing 69 may be fixed to the lower housing 48 adjacent the stem 59 if desired.

In the embodiment of the invention illustrated in FIGURE 4 a plurality of pumping mechanisms 70–75 are driven by a single rotating member 76. Since the mechanisms 70–75 are identical only the pump 75 is illustrated in detail.

This pumping mechanism 75 includes a lower housing 77 that is attached to the upper housing 78 by a plurality of bolts 79, and a flexible diaphragm 80 is disposed between the upper and lower housing. Two fluid couplings 81 and 82 are threaded into two openings 83 and 84, respectively, formed in the upper housing 78, and two check valves 85 and 86 are disposed in the two openings 83 and 84, respectively. The check valve 85 permits fluid flow into the pump chamber 87 and the check valve 86 permits fluid flow out of the chamber 87.

A connecting stem 88 is fastened at one end to the flexible diaphragm 80 and at its other end to a reciprocating member 89. The member 89 forms a magnet which is polarized in such a manner that one of its magnetic poles faces the rotating member 76 and its other pole faces in the direction of the diaphragm 80.

The rotatable member 76 is coupled to a driving motor by a central shaft 90 and has a plurality of magnets 91–94 fastened to it. The magnets 91–94 are polarized in such a manner that north and south poles are alternately presented to the magnet 89 causing it to be alternately repulsed and attracted. This produces reciprocating motion which is coupled to the flexible diaphragm 80 and causes the pumping action. As the member 76 rotates around the axis of the shaft 90 the pumping mechanisms 70–75 are successively activated in the described manner.

It is apparent that although only four magnets are described in each embodiment of the invention a greater or lesser number could be used. Obviously, the rate at which the reciprocating member vibrates will increase for the same number of revolutions of the rotating member if the number of magnets is increased.

The amount of force applied by the connecting stem to the flexible diaphragm can be varied by either varying the pole strength of the magnets or by increasing the number of magnets. One way in which the number of magnets can be increased is to provide a plurality of the rotatable members and have a plurality of the reciprocating members ganged on one connecting stem. It is apparent that either permanent or electromagnets can be used in accordance with this invention. The rotating and reciprocating members on which the magnets are mounted are preferably made of nonmagnetic material.

It can be seen that a novel and useful mechanism has been provided for converting rotary mechanical energy into linear reciprocating energy. This conversion is obtained by alternately bringing like and unlike magnetic poles together so that the alternate attraction and repulsion of the poles cause one of the members to vibrate. When a convertor of the type described is applied to pumping systems the apparatus is inexpensive and efficient and is able to handle small quantities of fluids at low pressures. Again in regard to pumping applications, the convertor may be used to drive a diaphragm as described, a piston, a bellofram, a bellows, or any other apparatus that will produce a pumping motion.

It will be apparent that modifications and variations may be effected without departing from the scope of the novel concepts of the present invention.

We claim as our invention:

1. A pump assembly comprising a shaft, a rotatable member mounted on said shaft, bearing means interposed between said rotatable member and said shaft to permit relative rotative movement therebetween, means on said rotatable member for coupling said rotatable member to a driving mechanism, a reciprocating member in closely spaced relation to said rotatable member, a plurality of magnets carried in one face of said rotatable member, a plurality of magnets carried in the face of said reciprocating member which confronts said one face of said rotatable member, all of said magnets being magnetized such that they present a single polarity along their confronting surfaces, the magnets in said rotatable member and in said reciprocating member presenting confronting surfaces whose magnetic polarity alternate in sequence, a flexible diaphragm coupled to said reciprocating member, a pump housing receiving said flexible diaphragm for reciprocation therein, a fluid inlet supplying fluid to said pump housing, and a fluid discharge in said housing for discharging pressurized fluid therefrom.

2. A pump assembly comprising a hollow shaft, a rotatable member mounted on said shaft, bearing means interposed between said rotatable member and said shaft to permit relative rotative movement therebetween, means on said rotatable member for coupling said rotatable member to a driving mechanism, a reciprocating member slidable within said hollow shaft in closely spaced relation to said rotatable member, a plurality of magnets carried in one face of said rotatable member, a plurality of magnets carried in the face of said reciprocating member which confronts said one face of said rotatable member, all of said magnets being magnetized such that they present a single polarity along their confronting surfaces, the magnets in said rotatable member and in said reciprocating member presenting confronting surfaces whose magnetic polarity alternates in sequence, a flexible diaphragm coupled to said reciprocating member, a pump housing receiving said flexible diaphragm for reciprocation therein, a fluid inlet supplying fluid to said pump housing, and a fluid discharge in said housing for discharging pressurized fluid therefrom.

References Cited in the file of this patent

UNITED STATES PATENTS

| | | |
|---|---|---|
| 2,310,357 | Edelman | Feb. 9, 1943 |
| 2,468,696 | Westberg | Apr. 26, 1949 |
| 2,790,095 | Peek | Apr. 23, 1957 |
| 2,943,216 | Spodig | June 28, 1960 |

FOREIGN PATENTS

| | | |
|---|---|---|
| 674,545 | Germany | Apr. 15, 1939 |
| 838,101 | Germany | May 5, 1952 |